United States Patent [19]

Shea

[11] 4,043,468
[45] Aug. 23, 1977

[54] RETRACTABLE RAMP FOR LIFTING OBJECTS INTO A VEHICLE

[76] Inventor: Frank Joseph Shea, 258 E. Shore Trail, Sparta, N.J. 07871

[21] Appl. No.: 673,254

[22] Filed: Apr. 2, 1976

[51] Int. Cl.² ............................................. B65G 67/02
[52] U.S. Cl. ....................................... 214/85; 14/71.1
[58] Field of Search ..................... 214/85, 85.1, 83.24; 14/71.1; 105/436

[56] References Cited

U.S. PATENT DOCUMENTS

| | | | |
|---|---|---|---|
| 408,805 | 8/1889 | Kent et al. | 14/71.1 |
| 2,284,419 | 5/1942 | Greig | 214/83.24 X |
| 2,327,680 | 8/1943 | Tavaris | 214/83.24 |
| 3,730,361 | 5/1973 | Haynes | 214/85 |
| 3,870,170 | 3/1975 | Noble et al. | 214/85 |

*Primary Examiner*—Robert G. Sheridan
*Attorney, Agent, or Firm*—Frederick W. Padden

[57] ABSTRACT

A retractable ramp is described for loading heavy objects into a vehicle, for example, for lifting a stretcher and patient up onto the floor of a modular ambulance, or rescue vehicle body. The ramp, which is stored on guides below the floor when not in use, comprises a retractable lower frame to which a ramp incline is hinged at its exterior end. The incline includes a pair of spaced, parallel, U-shaped channels. When in use, the lower frame is retracted, the incline is raised and secured to the floor and then the wheels of a stretcher are placed in the channels so that the stretcher (and patient) can be rolled up onto the floor by pushing the stretcher up the incline rather than by lifting.

6 Claims, 5 Drawing Figures

RETRACTABLE RAMP FOR LIFTING OBJECTS INTO A VEHICLE

BACKGROUND OF THE INVENTION

This invention relates to ramps for vehicles with elevated floors and, more particularly, to a retractable ramp adapted for guiding and rolling a stretcher onto the elevated floor of an ambulance.

When loading heavy objects into vehicles with elevated floors, such as van-like trucks, personnel often experience considerable physical strain in having to lift the object up a relatively large vertical height to the floor. This problem is particularly acute when ambulance attendants, especially women, have to lift a stretcher and patient into a truck-like ambulance. Excessive physical strain on the attendants endangers the safety of the patient on the stretcher, as well as the health of the attendant.

It is, therefore, a general object of this invention to facilitate the lifting of heavy objects onto an elevated floor.

It is a more specific object of this invention to provide a retractable ramp adapted to facilitate lifting a stretcher carrying a patient up onto the elevated floor of a truck-like ambulance.

SUMMARY OF THE INVENTION

In accordance with an illustrative embodiment of the invention, a vehicle having an elevated floor, such as a truck-like ambulance, is provided with a retractable ramp which is stored on guides below the floor when not in use. The ramp comprises a retractable lower frame to which a ramp incline is hinged at its exterior end. The incline includes a pair of spaced, parallel, elongated U-channels adapted to guide a stretcher, for example, up onto the floor. That is, after the lower frame is retracted, the incline is rotated on hinges and its elevated end is secured to the floor. The wheels of a stretcher are then placed in the U-channels and the stretcher and patient can be readily pushed up the incline onto the floor of the ambulance without undue physical strain of the attendants. This ambulance procedure also eliminates sudden or jerky motions often encountered in a direct vertical lift and, therefore, reduces the likelihood of causing discomfort, or even injury, to the patient.

BRIEF DESCRIPTION OF THE DRAWING

These and other objects of the invention, together with its various features and advantages, can be readily understood from the following more detailed description taken in conjunction with the accompanying drawing, in which.

DETAILED DESCRIPTION

Figure 1:
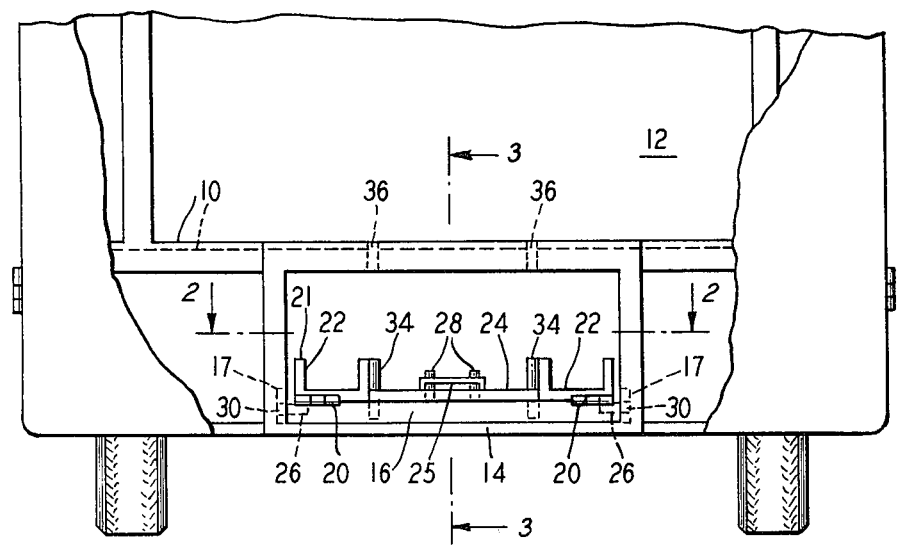
FIG. 1 is a partially cut-away rear view of a truck-like ambulance showing an end-view of a retractable ramp in accordance with an illustrative embodiment of the invention.

Turning now to FIG. 1, there is shown a rear view of a truck-like ambulance with its back doors removed and body panels partially cut away to expose an upper floor 10, intended to carry a stretcher and patient (not shown), and a retractable ramp 12 located in a compartment beneath upper floor 10. Ramp 12, in turn, is carried by a lower compartment floor 14 or other suitable part of the truck frame.

Figure 2:
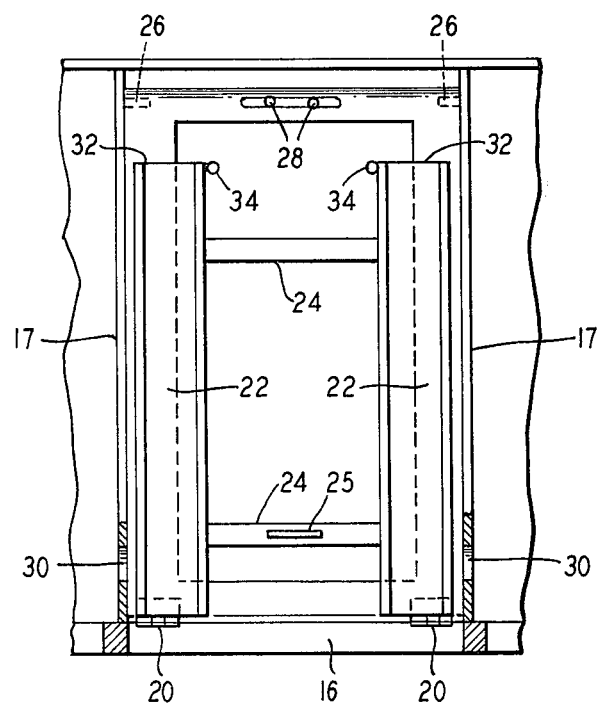
FIG. 2 is a cross-sectional view of the ramp taken along line 2—2 of FIG. 1.

In accordance with one illustrative embodiment of the invention, ramp 12 (shown in top view in FIG. 2 and in side view in FIGS. 3 and 4) comprises a rectangular lower frame 16 and an incline 18. The lower frame 16 is slidably positioned within parallel guides 17 which extend lengthwise on the lower floor 14, and includes a pair of horizontal, spring-loaded pins 26 near its interior end for reasons which will become clear hereinafter. The pins 26 are oriented perpendicular to the direction in which lower frame 16 is slid and can be retracted by pin-release means 28. On the other hand, incline 18, which is pivotally mounted to the exterior end of frame 16 by hinge means 20, is made up of a pair of elongated, parallel, U-shaped channels 22 which are rigidly held in spaced relation to one another by means of a pair of support bars 24.

Figure 3:
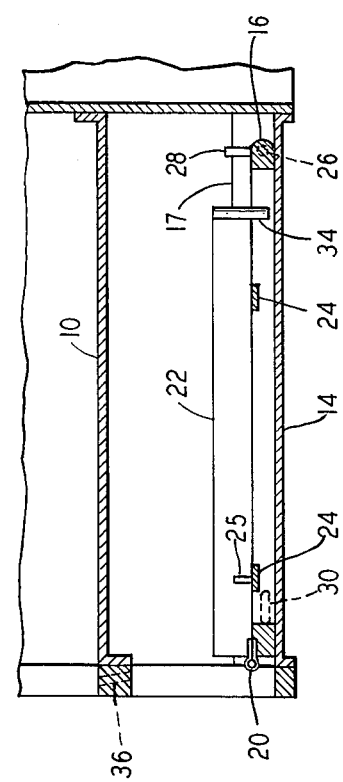
FIG. 3 is a cross-sectional view of the ramp taken along line 3—3 of FIG. 1.

When ramp 12 is not in use, incline 18 is folded down on top of lower frame 16 and the two are slid on guides 17 completely into the truck compartment as shown in FIG. 3, so that the compartment door (not shown) can be closed.

Figure 5:
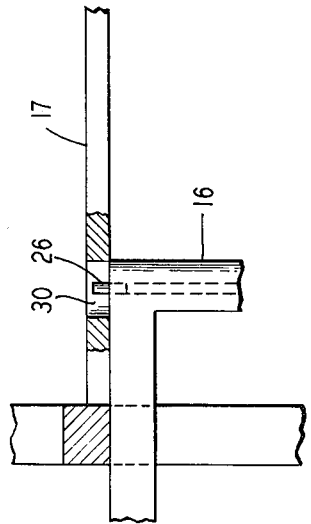
FIG. 5 is an enlarged view of the spring-loaded pins which hold the lower frame in place when the ramp is in use.
Figure 4:
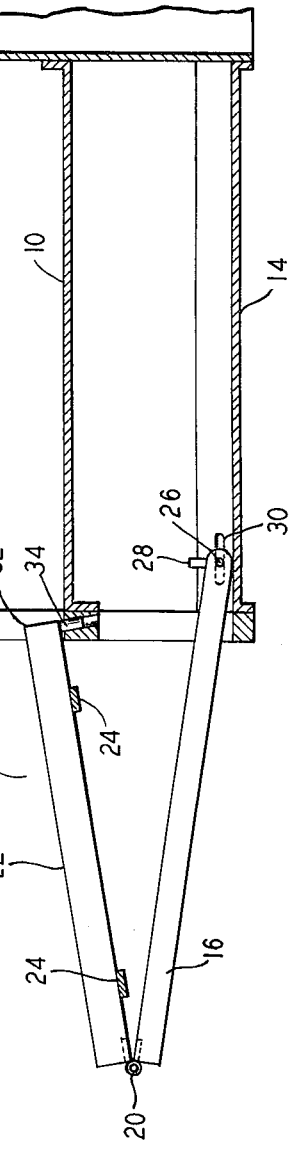
FIG. 4 is a side view of the ramp in its retracted position ready for guiding a stretcher up onto the floor of the ambulance.

When in use to lift a patient and stretcher up onto floor 10, the lower frame and folded incline 18 are withdrawn, as shown in FIG. 4, by pulling on handle 25 located on the exterior-most support bar 24. Initially, frame 16 is withdrawn to the point where spring-loaded pins 26 snap into holes 30 located near the exterior end of guides 17 (FIG. 5). The relative lengths of frame 16 and incline 18 are made so that incline 18 can be raised without striking the underside of floor 10. Then frame 16 is raised at an angle as shown in FIG. 4 and incline 18 is lowered until the ends 32 of U-shaped channels 22 are placed on upper floor 10. To secure incline 18 to floor 10 channels 22 are provided with downwardly protruding pins 34 which are inserted into obliquely oriented holes in floor 10, as seen in FIGS. 3 and 4. In this position, the bottom of incline 18 is only a short distance from the ground (typically one foot), i.e., at the height at which a stretcher is normally carried so that the stretcher wheels can be readily set down in the channels 22. To this end, the channels 22 are deep enough to guide the wheels but not so deep that the bottom of the stretcher drags on the flanges 21 of the channels. Then, the stretcher and patient can, without undue strain, be rolled up onto upper floor 10 by pushing the stretcher up the incline. To return the ramp 12 to its stored position, pins 34 at the ends of channels 22 are lifted out of holes 36 in upper floor 10. Incline 18 is folded down onto the lower frame 16. The pin release means 28 is actuated to retract pins 26 out of holes 30 in guides 17. The two are then pushed inward into the truck compartment. Note, in this position, pins 26 strike against the interior end of guides 17 but remain retracted because holes 30 are confined to the exterior ends of the guides.

It is to be understood that the above-described arrangements are merely illustrative of the many possible specific embodiments which can be devised to represent application of the principles of the invention. Numerous and varied other arrangements can be devised in accordance with this principle by those skilled in the art without departing from the spirit and scope of the invention. Thus, for example, with suitably modified U-shaped channels, the invention can be used in conjunction with a dolly to load heavy boxes or other objects into a truck or van.

What is claimed is:

1. A ramp for lifting objects up onto the floor of a vehicle comprising
   a frame slidably mounted below said floor,
   an incline pivotally connected near the exterior end of said frame and being folded down upon said frame when not in use,
   a pair of spaced guides mounted below said floor for guiding said frame,
   said guides each having a hole located near to the exterior end thereof,
   said frame having near its interior end a pair of spring-loaded pins which snap into said guide holes when said frame is slid from beneath said floor,
   means on said frame for retracting said spring-loaded pins when said frame is to be moved out of said holes and
   means located near the interior end of said incline for securing said incline to said floor when said frame is slid from beneath said floor and said incline is raised up onto said floor.

2. A ramp according to claim 1 wherein said incline comprises
   a pair of elongated, U-shaped channels of sufficient length to extend from said floor to approximately the point where said incline and said frame are pivotally connected, and
   support means for maintaining said channels in spaced, parallel relation to one another.

3. A ramp according to claim 2 wherein said floor has a pair of oblique holes therein and said securing means includes a pair of pins, one affixed to each of said channels at the interior ends thereof and extending downwardly therefrom, said pins being adapted to be received by said holes when said incline is raised up onto said floor.

4. A ramp according to claim 1 wherein the object is a wheeled stretcher and the vehicle is a truck-like ambulance wherein said guides are positioned so that when said frame is withdrawn it is situated at a height from the ground corresponding approximately to the height at which said stretcher is typically carried, and the depth of said channels is adapted to receive the wheels of said stretcher without having the stretcher drag on the flanges of said channels.

5. A retractable ramp for lifting a wheeled stretcher and patient onto the floor of a truck-like ambulance comprising
   a pair of elongated, spaced guides mounted below said floor at a height from the ground corresponding approximately to the height at which said stretcher is typically carried,
   said guides each having a hole located near the exterior ends thereof,
   a rectangular frame slidably mounted on said guides,
   said frame including near its interior end a pair of spring-loaded pins which snap into said holes when said frame is slid from beneath said floor, and means on said frame for retracting said spring-loaded pins when said frame is to be moved out of said holes,
   an incline pivotally connected near the exterior end of said frame and being folded down upon said frame when not in use,
   said incline comprising a pair of elongated, U-shaped channels of sufficient length to extend from said floor to approximately the point where said incline and said frame are pivotally connected, the depth of said channel being adapted to receive the wheels of said stretcher without having the stretcher drag on the flanges of said channels,
   support means for maintaining said channels in spaced, parallel relation to one another, and
   a pair of pins, one affixed to each of said channels at the interior ends thereof and extending downwardly therefrom,
   said floor having a pair of obliquely oriented holes adapted to receive said pins when said incline is lowered onto said floor.

6. A ramp according to claim 5 wherein said support means comprises at least two spaced, bar-like members rigidly connecting said channels together and including a handle on the exterior-most member for sliding said frame and incline.

* * * * *